July 31, 1923.

J. R. ALLAN 1,463,188

ENGINEER'S VALVE FOR PNEUMATIC SANDERS

Filed Feb. 6, 1922

INVENTOR:
John R. Allan
By MacLeod, Calver, Copeland & Dike
Attys.

Patented July 31, 1923.

1,463,188

UNITED STATES PATENT OFFICE.

JOHN R. ALLAN, OF BOSTON, MASSACHUSETTS, ASSIGNOR TO HANLON LOCOMOTIVE SANDER COMPANY, OF WINCHESTER, MASSACHUSETTS, A CORPORATION OF MASSACHUSETTS.

ENGINEER'S VALVE FOR PNEUMATIC SANDERS.

Application filed February 6, 1922. Serial No. 534,284.

*To all whom it may concern:*

Be it known that I, JOHN R. ALLAN, a citizen of the United States, residing at Boston, county of Suffolk, State of Massachusetts, have invented a certain new and useful Improvement in Engineers' Valves for Pneumatic Sanders, of which the following is a specification, reference being had therein to the accompanying drawings.
My invention relates to a new and improved engineer's valve by means of which the supply of air to a pneumatic track sander is controlled. The invention is an improvement on the device shown in the United States Patent, No. 958,393, to J. H. Hanlon, dated May 17, 1910.

In the device shown in said patent there is provided a valve with a conical member having a conical seat. One drawback to valves of this form of construction is that dust or other form of grit sometimes enters through the ports and gets between the valve and the valve seat, and by reason of the tapered form of the valve and valve seat, the grit becomes wedged between them, thereby not only making it more difficult to operate the valve but also causing undue wear on the valve member and on the valve seat. One object of the present invention is to provide a form of construction which will at least reduce, if not entirely prevent, the introduction of grit between the valve and the valve seat.

Another drawback to valves of the construction shown in said patent is that it sometimes happens that the valve stem is broken off at the top of the valve body by accident and this necessitates the removal of the same and substitution of a new stem or else throwing the valve away. Practically it is almost useless to repair the valve by substituting a new stem because it is difficult to do so in a manner that will prevent the valve from leaking. There is also in such case entailed great labor and expense in grinding the conical seat portion of the valve. One object of the present invention is to provide a flat seat in the valve body instead of a conical seat, and to provide the valve with a gasket permeated with some sort of lubricant to form the seating portion of the valve. One feature of the invention consists, therefore, in making the valve stem with a shoulder to correspond with the flat seat in the valve body and to provide the stem with a lubricant treated gasket of leather or other suitable material which forms that portion of the valve which comes in contact with the seat in the body. With such form of construction, if the valve stem becomes broken off, it is necessary only to renew the valve stem, using the same gasket, or if the gasket is worn out before the valve stem is broken a new gasket may be provided for the old stem.

Locomotive engineers in particular have complained about the wearing of the metal valve. Where sanders have been used on long grades it has been a special source of complaint that the valve moves hard and that they would use considerable more sand in ascending the long grades by reason of the slowness of the operation of the valve due to its dry seat.

The invention will be fully understood from the following description when taken in connection with the accompanying drawings, and the novel features thereof will be pointed out and clearly defined in the claims at the close of this specification.

In the drawings, Fig. 1 is a vertical section of an engineer's valve embodying the invention.

Figure 1:
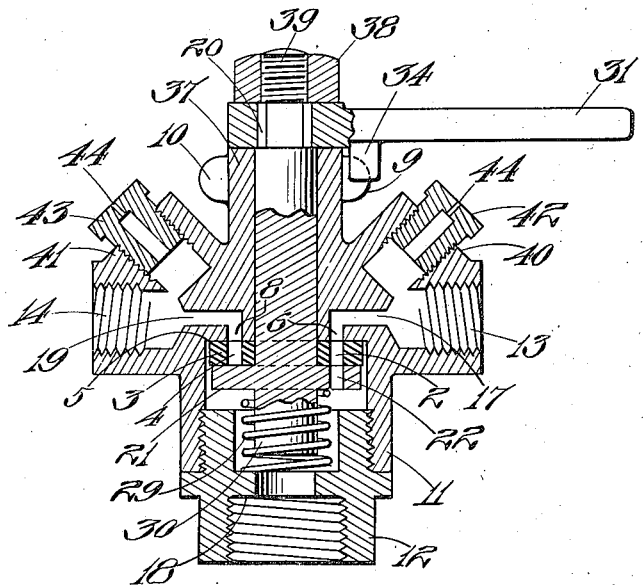
Figure 4:
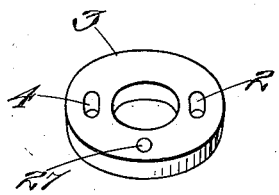
Fig. 4 is a perspective of the separable gasket which cooperates with the stem and valve member shown in Fig. 3.
Figure 3:
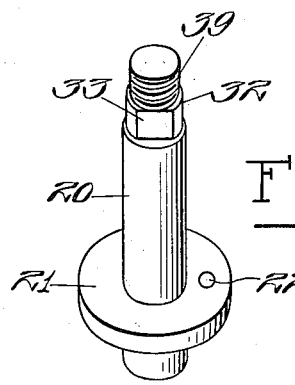
Fig. 3 is a perspective of the stem and flange which form the rotatable valve member.
Figure 2:
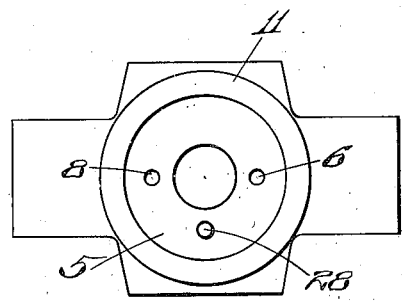
Fig. 2 is a bottom plan view of the valve casing, the coupling being removed.

Referring now to the drawings, there is shown at 11 the casing or body of an engineer's valve. This casing is constructed to be connected by means of a coupling member 12 to the pipe through which the air is received from the air pump or other suitable source of air pressure, not shown. At 13 is shown an air outlet leading to the forward sander, not shown, this being the sander which is in operation when the locomotive is moving forward. At 14 is shown the air outlet leading to the rear sander, also not shown. The valve casing is provided with an annular horizontal valve seat 5. Two outlet ports lead upward from the valve seat parallel with the axis of the valve body, and preferably diametrically opposite each other, and then turn at right-angles outward to open into the discharge ports 13, 14 respectively. The outlet port leading to the discharge opening 13 has an upwardly extending portion 6 which by a right-angled turn merges into a portion 17; the outlet port leading to the discharge opening 14 has the upwardly extending portion 8 which by a right-angled turn merges into a portion 19 which leads to the discharge outlet 14.

Within the valve casing is located a rotatable valve member having a stem 20 and an annular flange 21 which is preferably integral therewith and forms the valve proper. The flanged valve member 21 is formed with an aperture 22 which is adapted to be brought into registration with either one or the other of the vertical holes through the valve seat by turning the valve stem 20 in one direction or the other, and when so brought into registration there is a passage for the air from the air pump and pipe up through the coupling 12, and through the chamber in the lower portion of the body 11, thence through one or the other of the openings 6, 8, according to whichever one is in registration with the aperture 22, and thence out through the horizontal portion of the port 17 or 19 as the case may be, and thence through one of the discharge ports 13 or 14.

A gasket 3 is provided between the valve member 21 and the valve seat 5, and this gasket should be formed with passages corresponding with the passages 6, 8 in the valve seat. The gasket is provided with the ports 2, 4, which as stated are in registration with the ports 6, 8, in the valve seat. In order to maintain the gasket always in fixed relation to the valve seat, said gasket is formed with a hole 27 and the valve seat is formed with a pin 28 which engages with said hole 27 in the gasket, so that the gasket will be prevented from rotating on the valve seat, and thus the apertures 2, 4 will always be in alignment with the apertures 6, 8 of the valve seat.

Preferably this gasket is made of oil leather or leather containing a considerable amount of greasy substance, so that the upper face of the valve member 21 will easily move over the under face of the said gasket when the valve member 21 is rotated on its axis by turning the stem 20. The said gasket 3 is always maintained upon the seat 5 and is held against rotation and is stationary and itself forms the real seat for the rotatable valve 21. Any suitable gasket, however, may be employed and any suitable means for reducing the friction may be used.

The coupling member 12 has a screw-threaded connection with the tubular lower portion of the valve casing 11 and is formed with an internal annular flange 18 on which is seated a spring 29 which surrounds the downwardly extending lower portion 30 of the valve stem, the upper end of the said spring engaging with the under side of the valve member 21. The spring 29 holds the valve member 21 with upward tension so as to press the gasket 3 upward in close engagement with the valve seat.

The upper end of the valve stem 20 is fitted for engagement with the socket of the handle 31. The valve stem preferably has a reduced portion 32 near the upper end formed with a flat face 33, and the socket of the handle 31 is formed with a similar flat face so that when the handle is engaged with the stem the stem may be rotated. Any other suitable form of construction, however, may be employed for permitting an operative connection between the handle and the valve stem.

The handle 31 is formed with a downward extending lug 34 which is adapted to engage with the lugs 9, 10, on diametrically opposite sides of the upwardly extending tubular portion 37 of the valve body to limit the throw of the valve in either direction. Said lugs are in such position that when the handle is turned to the extreme limit of its movement, the hole 22 in the valve member 21 will be in alignment with one or the other of the two apertures 2, 4 in the gasket 3 and with one or the other of the two holes 6, 8 in the valve seat. The handle 31 is held in place on the shank portion 32 of the valve stem by means of the nut 38 screwed onto the threaded upper end portion 39 of the valve stem.

The valve body is formed with upwardly inclined lugs 40, 41 projecting from opposite sides of the periphery of the valve body, said lugs being formed with passages leading from the outer end and opening into the discharge passages 13, 14, respectively, to serve as clean-out openings. These tubular passages are closed by screw-threaded plugs 42, 43, respectively, and the heads of the plugs are respectively formed with a small aperture 44 for the admission of a wire for cleaning and also to serve as a vent to permit the escape of a small quantity of air to inform the engineer of the condition of the valve. This feature, however, is fully shown and described in the patent to Hanlon, No. 958,393, heretofore referred to, and does not form a part of the present invention.

What I claim is:

1. In a valve of the character described, a valve body having a valve seat provided with a grease saturated leather bearing member secured thereto, and forming the real valve seat, and a rotary valve having a stem which extends through the valve seat, the said valve being at all times seated upon said valve seat and rotatable thereon.

2. In a valve of the character described, a valve body having a valve seat in a plane at substantially right angles to the axis of the valve body, a gasket secured thereto, a rotary stem which extends through the gasket and valve seat, an air discharge passage which extends upwardly through the gasket and valve seat into the said body, and thence extends outward through the side wall of the valve body to form a discharge outlet, said valve stem having a shoulder portion which engages said gasket, said shoulder portion of the stem having a hole therethrough which is adapted to be brought into and out of alignment with the passage through the gasket and valve seat by rotating the valve stem and which is always open at its lower end to a source of air supply.

3. In a valve of the character described, a valve body having a valve seat in a plane at right angles to the aixis of the valve body, an air discharge passage which extends upwardly through the valve seat into the said body and thence turns and extends laterally outward through the side wall of the valve body to form a discharge outlet, a gasket of compressible material secured to the under side of said seat, said gasket having a hole which is in alignment with said air passage in the valve seat, a rotary stem which extends through the valve body and seat and gasket, and a valve member mounted on said stem which engages the said gasket, said valve member having a hole therethrough which is adapted to be brought into and out of alignment with the passage through the gasket and valve seat by rotating the valve stem and which is open at its lower end to a source of air supply.

4. In a valve of the character described, a valve body having an annular valve seat in a plane at right angles to the axis of the valve body, two passages each having a portion wihich extends upward through the valve seat into the said body for a distance, and then extends outward through the side of the valve body, a rotary stem which extends through the valve seat and a valve member mounted thereon which engages said seat, said valve member having a hole therethrough which is adapted to be brought into alignment with either one of said passages through the valve seat by rotating the valve member, and which is open at its lower end to a source of air supply.

5. In a valve of the character described, a valve body having an annular valve seat in a plane at right angles to the axis of the valve body, two passages each having a portion which extends upward through the valve seat into the said body for a distance, and then extends outward through the side of the valve body, a gasket secured to the under side of said seat, said gasket having two holes which are respectively in alignment with said air passages through the valve seat, a rotary stem which extends through the valve seat and gasket, and a valve member mounted thereon which engages said seat, said valve member having a hole therethrough which is adapted to be brought into alignment with either one of said passages through the said gasket and valve seat by rotating the valve stem, and which is open at its lower end to a source of air supply.

6. In a valve of the character described, a valve body having a valve seat in a plane at right angles to the axis of the valve body, an air discharge passage which extends upwardly through the valve seat into the said valve body, and thence extends outward from the seat of the valve body to form a discharge outlet, a gasket on the under side of said valve seat, said gasket having a pinhole therethrough, and said valve seat having a pin projecting therefrom which engages with said pin-hole in the gasket to maintain said gasket in fixed relation to the valve seat, said gasket having another hole therethrough which is in alignment with the said air passage in the valve seat, a rotary stem which extends through the valve body and seat, a valve member mounted on said stem which engages the said gasket, said valve member having a hole therethrough which is adapted to be brought into and out of alignment with the passage through the gasket and valve seat by rotating the valve stem, and which is open at its lower end to a source of air supply.

7. In a valve of the character described, a valve body having a valve seat in a plane at right angles to the axis of the valve body, two air discharge passages which extend upwardly through the valve seat into the said body, and thence extend laterally outward through the side wall of the valve body to form two discharge outlets, a gasket on the under side of said valve seat, said gasket having a pinhole therethrough, and said valve seat having a pin projecting therefrom which engages with said hole in the gasket to maintain said gasket in fixed relation to the valve seat, said gasket having two holes which are respectively in alignment with said air passages through the valve seat, a rotary stem which extends through the valve seat and gasket, and a valve member mounted thereon which engages said seat, said valve member having a hole therethrough which is adapted to be brought into alignment with either one of said passages through the said gasket and valve seat by rotating the valve stem, and which is open at its lower end to a source of air supply.

8. In a valve of the character described, a valve body having a valve seat, an air discharge passage which extends upwardly through the valve seat and outward through the side wall of the valve body to form a discharge outlet, a gasket secured to the under side of said seat, said gasket having a hole which is in alignment with said air passage in the valve seat, a rotary stem which extends through the valve body and seat and gasket, and a valve member mounted on said stem which engages the said gasket, said valve member having a hole therethrough which is adapted to be brought into and out of alignment with the passage through the gasket and valve seat by rotating the valve stem and which is open at its lower end to a source of air supply, said gasket having an anti-friction substance on the face which is in contact with the said valve member.

In testimony whereof I affix my signature.

JOHN R. ALLAN.